US009979993B2

(12) United States Patent
Ruffini et al.

(10) Patent No.: US 9,979,993 B2
(45) Date of Patent: May 22, 2018

(54) NETWORK FOR PERSONALIZED CONTENT AGGREGATION PLATFORM

(71) Applicant: Verizon Patent and Licensing Inc., Arlington, VA (US)

(72) Inventors: Michael P. Ruffini, Methuen, MA (US); John K. Trimper, Groton, MA (US); Sankar Subramanian, Ossining, NY (US); Joseph G. Fragale, Ridgewood, NJ (US); Dwight W. Fronsdahl, Groton, MA (US); Paul D. Heitlinger, Short Hills, NJ (US); Rahul Kher, Lexington, MA (US); Eric N. Klings, Freehold, NJ (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 12 days.

(21) Appl. No.: 14/486,120

(22) Filed: Sep. 15, 2014

(65) Prior Publication Data

US 2016/0080793 A1    Mar. 17, 2016

(51) Int. Cl.
*H04N 21/2668* (2011.01)
*H04N 21/45* (2011.01)
*H04N 21/422* (2011.01)
*H04N 21/41* (2011.01)
*H04N 21/414* (2011.01)
*H04N 21/239* (2011.01)
*H04N 21/462* (2011.01)
*H04N 21/482* (2011.01)
*H04N 21/858* (2011.01)
(Continued)

(52) U.S. Cl.
CPC ..... *H04N 21/2668* (2013.01); *H04N 21/2393* (2013.01); *H04N 21/26241* (2013.01); *H04N 21/4126* (2013.01); *H04N 21/41407* (2013.01); *H04N 21/42204* (2013.01); *H04N 21/4532* (2013.01); *H04N 21/4622* (2013.01); *H04N 21/4821* (2013.01); *H04N 21/812* (2013.01); *H04N 21/8586* (2013.01)

(58) Field of Classification Search
CPC ............. H04N 21/482; H04N 21/4532; H04N 21/4622; H04N 21/812; H04N 21/42204; H04N 21/2668
See application file for complete search history.

(56) References Cited

U.S. PATENT DOCUMENTS 9,497,500 B1* 11/2016 Robinson ........... H04N 21/4126
2004/0203338 A1* 10/2004 Zilliacus ............ H04N 5/44582
455/3.04
(Continued)

*Primary Examiner* — Brian T Pendleton
*Assistant Examiner* — Krista A Contino Saumby

(57) ABSTRACT

One or more network devices provide, to a user device, a content list of content items available for presentation. The one or more network devices receive, from the user device, a personalized channel plan that includes a schedule of selected content items, from the content list, for presentation on a viewing device that is different than the user device. The one or more network devices select, based on the selected content items, advertising for inclusion with the selected content items and assign links for the viewing device to obtain the selected content items. The one or more network devices send the links to the user device, which may in turn be provided to the viewing device.

20 Claims, 9 Drawing Sheets

(51) Int. Cl.
*H04N 21/81* (2011.01)
*H04N 21/262* (2011.01)

(56) References Cited

U.S. PATENT DOCUMENTS

| | | | | |
|---|---|---|---|---|
| 2005/0246739 A1* | 11/2005 | Davidson | G06Q 20/3674 | 725/45 |
| 2007/0214482 A1* | 9/2007 | Nguyen | G06F 17/30017 | 725/91 |
| 2008/0066125 A1* | 3/2008 | Li | H04N 7/165 | 725/97 |
| 2010/0251304 A1* | 9/2010 | Donoghue | H04N 21/25891 | 725/46 |
| 2011/0004826 A1* | 1/2011 | Cho | H04H 20/26 | 715/716 |
| 2011/0078717 A1* | 3/2011 | Drummond | H04N 21/4586 | 725/14 |
| 2012/0005527 A1* | 1/2012 | Engel | H04H 60/64 | 714/15 |
| 2012/0137324 A1* | 5/2012 | E | G06Q 30/00 | 725/35 |
| 2012/0192214 A1* | 7/2012 | Hunn | G06Q 30/02 | 725/9 |
| 2012/0210371 A1* | 8/2012 | McCoy | H04N 21/42219 | 725/62 |
| 2012/0240177 A1* | 9/2012 | Rose | H04N 21/252 | 725/116 |
| 2012/0331504 A1* | 12/2012 | Byun | H04N 21/41407 | 725/39 |
| 2013/0014169 A1* | 1/2013 | Sansom | G06F 17/3082 | 725/48 |
| 2013/0103503 A1* | 4/2013 | Zhang | G06Q 10/10 | 705/14.66 |
| 2013/0103785 A1* | 4/2013 | Lyon | H04N 21/2385 | 709/217 |
| 2013/0312049 A1* | 11/2013 | Niyogi | H04N 21/25883 | 725/110 |
| 2014/0039654 A1* | 2/2014 | Akiyama | H04N 21/41407 | 700/94 |
| 2014/0089980 A1* | 3/2014 | Alexander | H04N 5/44543 | 725/42 |
| 2014/0150022 A1* | 5/2014 | Oh | H04N 21/478 | 725/37 |
| 2014/0173648 A1* | 6/2014 | Ball | H04N 21/25 | 725/25 |
| 2014/0198645 A1* | 7/2014 | Worrall | H04W 4/06 | 370/230 |
| 2014/0310518 A1* | 10/2014 | Giladi | H04N 21/2347 | 713/165 |
| 2015/0089523 A1* | 3/2015 | Volovich | H04N 21/23103 | 725/14 |

* cited by examiner

NETWORK FOR PERSONALIZED CONTENT AGGREGATION PLATFORM

BACKGROUND

Along with live linear television content, service providers also offer products that allow customers to download video content (e.g., streaming video, video files, etc.) on demand over a distribution network. Broadcast content options may be presented to the customer via an electronic program guide. Access to on-demand video content is typically presented to the customer via a catalog of available items. Some customers may supplement consumption of live linear television and/or on-demand content with content available through various Internet web sites.

DETAILED DESCRIPTION OF PREFERRED EMBODIMENTS

The following detailed description refers to the accompanying drawings. The same reference numbers in different drawings may identify the same or similar elements.

Systems and methods described herein may provide a personalized content aggregation platform. The personalized content aggregation platform enables users to configure personalized content schedules (also referred to herein as "personalized channel plans") from multiple content sources and/or for multiple types of content. In one implementation, the personalized channel plan may be configured using a navigation device (e.g., a user device, such as a tablet computer or smart phone), which may instruct a viewing device (e.g., a set-top box or smart television) to present the content for the personalized channel plan according to the configured time and sequence. In another implementation, the personalized channel plan may be shared with other users (e.g., via social media, etc.).

Among other capabilities, a network to support the personalized content aggregation platform may make available application programming interfaces to enable communications between navigation and viewing devices, provide unicast/multicast hybrid content delivery, apply regional broadcast variants (e.g., regional schedules, blackouts, etc.), enforce digital rights management (DRM), and direct/track targeted advertising. In one implementation, the network may include a closed access network to provide content for personalized channels with guaranteed quality of service (QoS).

According to one implementation, one or more network devices may provide, to a user device, a content list of content items available for presentation. The one or more network devices may receive, from the user device, a personalized channel plan that includes a schedule of selected content items, from the content list, for presentation on a viewing device that is different than the user device. The one or more network devices may select, based on the selected content items, advertising for inclusion with selected content items and assign links for the viewing device to obtain the selected content items. The one or more network devices may send the links to the user device, which may in turn be provided to the viewing device.

Figure 1:
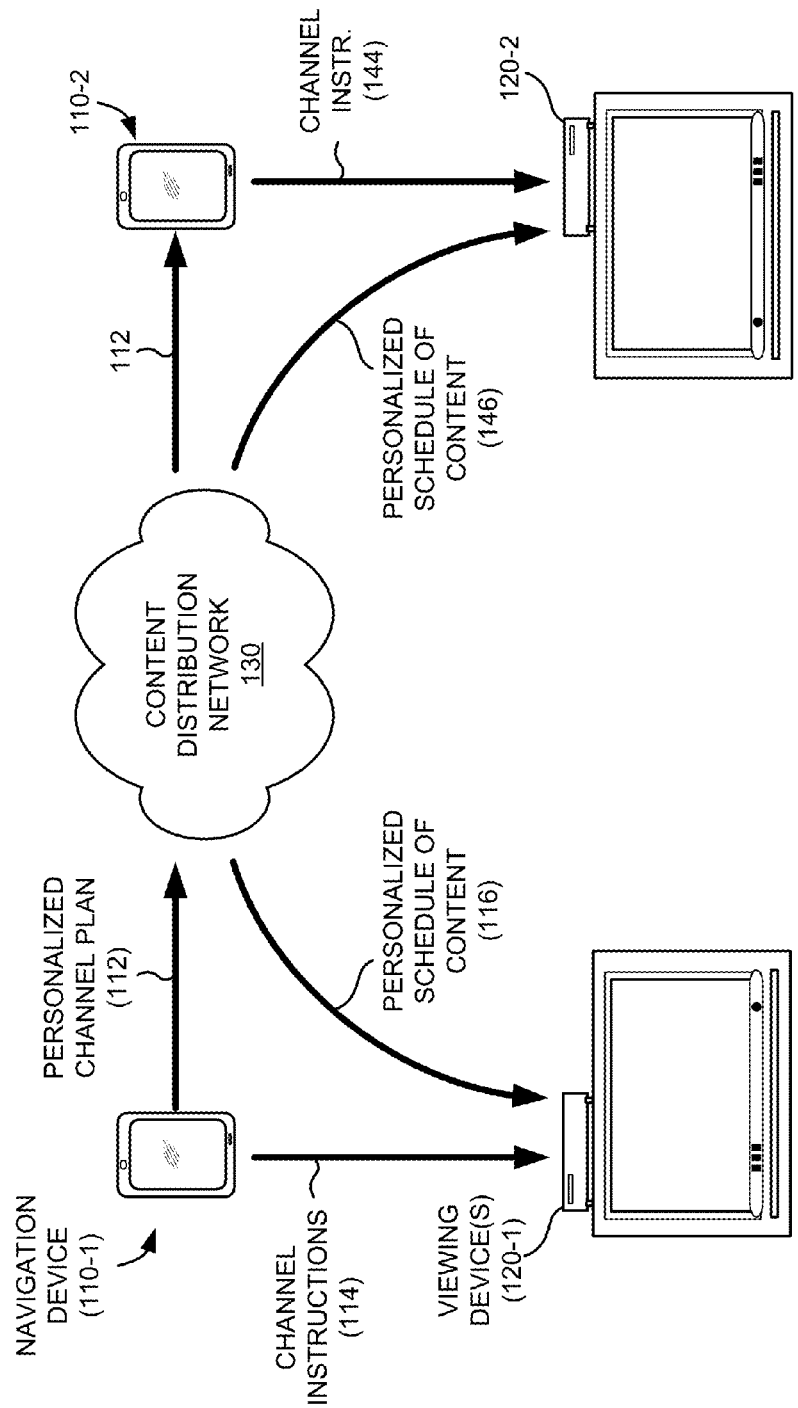
FIG. 1 is a diagram illustrating concepts described herein.

FIG. 1 is a diagram illustrating concepts described herein. A navigation device 110-1 (e.g., a tablet computer, smart phone, etc.) may be equipped with a personal channel manager application that enables a user to select a personalized channel plan 112 of linear and/or non-linear content that can be presented on a viewing device 120-1 (such as a set-top box (STB) and/or television). Personalized channel plan 112 may include content from, for example, multiple linear television channels (e.g., different physical or virtual television channels), video on demand (VOD) content, games, social media sites, video-sharing websites, etc. For example, navigation device 110-1 may obtain a catalog of available content from a content distribution network 130, which may be operated by a service provider that provides subscription-based services (e.g., television services, Internet access services, and/or other telecommunications services).

Navigation device 110-1 may identify (or discover) available viewing device 120-1 on which content from personalized channel plan 112 can be presented. Based on personalized channel plan 112, navigation device 110-1 may send channel instructions 114 to viewing device 120-1. Channel instructions 114 may include, for example, links and timing information for particular content. As used herein, a "link" may generally refer to any pointer or instruction to identify a location, such as a uniform resource locator (URL), an Internet Protocol (IP) address, or channel indicator. Based on channel instructions 114, viewing device 120-1 may retrieve a personalized schedule of content 116 from content distribution network 130. As described further herein, personalized schedule of content 116 may include scheduled content along with targeted advertising and/or appropriate regional broadcast variations for viewing device 120-1.

A user of navigation device 110-1 may share personalized channel plan 112 with another user of a user device 110-2. Channel plan 112 may be shared, for example, using a social media account or communications via content distribution network 130. Based on personalized channel plan 112, navigation device 110-2 may send channel instructions 144 to viewing device 120-2. Channel instructions 144 may be the same as channel instructions 114, or channel instructions 144 may have variations to reflect regional differences, subscription differences, user profile difference, etc., between navigation device 110-1 and navigation device 110-2. Based on channel instructions 144, viewing device 120-2 may retrieve a personalized schedule of content 146 from content distribution network 130. As described further herein, personalized schedule of content 146 may include scheduled content along with targeted advertising and/or appropriate regional broadcast variations for viewing device 120-2.

In one implementation, viewing devices 120-1/120-2 may use links received from respective navigation devices 110-1/110-2 to obtain content directly from content distribution network 130. For example, viewing devices 120-1/120-2 may retrieve content via a dedicated access network, such as a closed cable and/or fiber optic distribution network, that can provide guaranteed quality of service (QoS) levels. In other implementations, viewing devices 120-1/120-2 may use links received from navigation devices 110-1/110-2 to obtain content via a public IP network or receive content directly from navigation devices 110-1/110-2.

Figure 2:
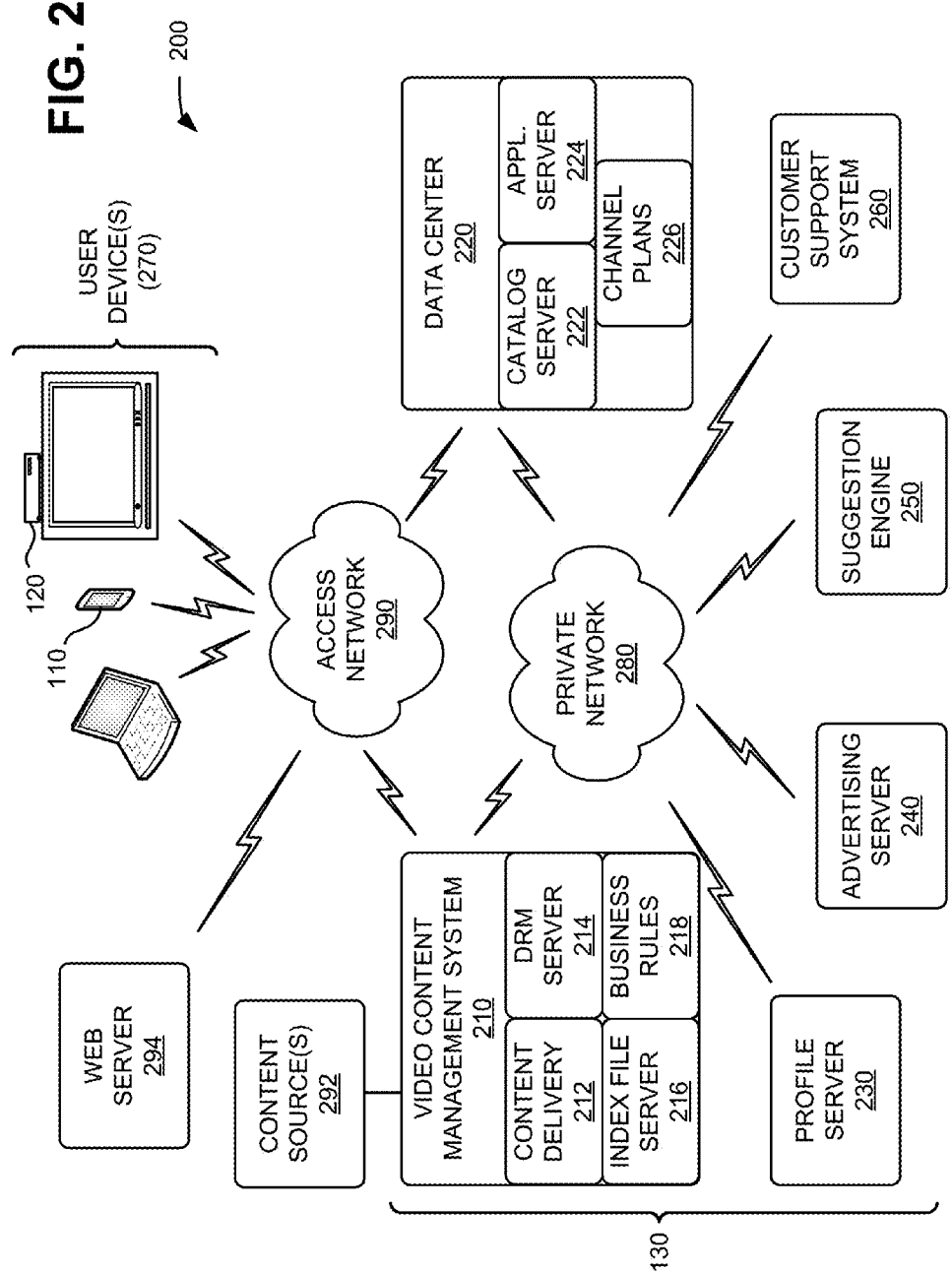
FIG. 2 is an exemplary network in which systems and/or methods described herein may be implemented.

FIG. 2 is an exemplary network 200 in which systems and/or methods described herein may be implemented. As illustrated, network 200 may include a video content management system (VCMS) 210, a data center 220, a profile server 230, an advertising server 240, a suggestion engine 250, a customer support system 260, user devices 270, a private network 280, an access network 290, content sources 292, and a web server 294. VCMS 210, data center 220, profile server 230, advertising server 240, suggestion engine 250, customer support system 260, and private network 280 may be part of content distribution network 130. The particular arrangement and number of components of network 200 shown in FIG. 2 are illustrated for simplicity. In practice there may be more VCMSs 210, data centers 220, profile servers 230, advertising servers 240, suggestion engines 250, customer support systems 260, user devices 270, networks 280/290, content sources 292, and/or web servers 294. Components of network 200 may be connected via wired and/or wireless connections.

VCMS 210 may include one or more network devices, or other types of computation or communication devices, to aggregate content and content metadata, process content, and distribute content. In one implementation, VCMS 210 may include a content delivery system 212, a digital rights management (DRM) server 214, an index file server 216, and business rules 218. VCMS 210 may aggregate content and transcode content into a digital format suitable for consumption on particular user devices 270. For example, VCMS 210 may include a transcoding device to convert a video file from one format to another (e.g., from one bit rate to another bit rate, from one resolution to another, from one standard to another, from one file size to another, etc.). VCMS 210 may also encrypt data and communicate with DRM server 214 to enforce digital rights. In some cases, VCMS 210 may also supply content with particular regional (e.g., location-based) variations.

Content delivery system 212 may include one or more network devices, or other types of computation or communication devices, to deliver multimedia content from a backend server to user devices 270. In one implementation, content delivery system 212 may include a streaming server that provides streaming data packets (e.g., via a streaming URL) to user devices 270 (e.g., via network 280). According to one implementation, a streaming URL may be session-based, such that each URL can be used only once for one user device 270 for security purposes. In another implementation, content delivery system 212 may provide interactive content, such as games, etc.

DRM server 214 may include one or more network devices, or other types of computation or communication devices, to issue, validate, and/or enforce DRM licenses to a client, such as an application running on one of user devices 270. In implementations described herein, DRM server 214 may communicate with user device 270 to authenticate a user of user device 270, the particular user device 270, and/or an application residing on user device 270. For example, DRM server 214 may request/receive login information associated with the user, and compare the login information with stored information to authenticate the user. Additionally, or alternatively, DRM server 214 may request/receive device information (e.g., a unique device identifier) associated with user device 270 and may compare the device information with stored information to authenticate user device 270.

Index file server 216 may include one or more network devices, or other types of computation or communication devices, to store index files of content from content sources 292. Each entry in the index file may allow viewing device 120 to be directed to a particular piece of media corresponding to content (e.g., streamed content) being delivered to viewing device 120. According to one implementation, the index file may also contain formatted advertising URLs (referred to herein as "ad-URLs") that direct viewing device 120 to retrieve separate advertising content that corresponds in time to advertising breaks in a liner content stream. In another implementation, the ad-URLs may include parameters that inform viewing device 120 that it needs to switch to a mode where it displays advertising. The parameters in the ad-URL may also inform viewing device 120 which ads need to be displayed along with information such as duration of an advertisement.

Business rules 218 may include one or more network devices, or other types of computation or communication devices, to associate advertising with a particular type of content based on the projected audience. For example, business rules 218 may identify particular advertising available and/or suitable for viewers of a particular program stream. Index file server 216 may apply business rules 218 to generate advertising information (e.g., links to particular advertising content) that may be associated with advertising breaks of an index file.

Data center 220 may include one or more network devices, or other types of computation or communication devices, to manage the authorization, selection, scheduling, and/or purchase of multimedia content by a user of user devices 270. As shown in FIG. 2, data center 220 may include a catalog server 222, an application server 224, and channel plans 226. In one implementation, data center 220 may be accessed by user devices 270 via access network 290.

Catalog server 222 may include one or more network devices, or other types of computation or communication devices, to provide a unified catalog of multimedia content for users (e.g., of user devices 270) to consume (e.g., view, buy, or rent). Catalog server 222 may include, for example, program guide data for television content, on-demand content data, games, etc. In one implementation, catalog server 222 may collect and/or present listings of content available to user devices 270. For example, catalog server 222 may receive content metadata, such as lists or categories of content, from VCMS 210. Catalog server 222 may use the content metadata to provide currently-available content options to user devices 270. Catalog server 222 may provide the content metadata to user devices 270 directly or may communicate with user devices 270 via application server 224.

Application server 224 may include one or more network devices, or other types of computation or communication devices (e.g., a server device, an application server device, a Web server device, a database server device, a computer, etc.), to provide a backend support system for mobile applications residing on user devices 270. For example, application server 224 may permit user devices 270 to download a personal channel manager application that may permit a user to find content of interest, schedule content presentation, and/or play downloaded or streaming content. The personal channel manager application may enable user devices 270 to present to a user of user device 270 information received from data center 220 in an interactive format to allow selection of particular multimedia content. Additionally, or alternatively, application server 224 may provide content metadata, such as lists or categories of content. Also, application server 224 may authenticate a user who desires to view, purchase, or rent multimedia content. In one implementation, the interactions between application server 224 and user device 270 may be performed using hypertext transfer protocol (HTTP) or secure HTTP (HTTPS) via access network 290.

Channel plans 226 may include a stored schedule of selected content items (e.g., selected by a user from catalog server 222) for presentation. In one implementation, channel plans 226 may be associated with a single user (e.g., a personalized channel owner) on a particular viewing device 120. In another implementation, channel plans 226 may be associated with multiple users (e.g., a personalized channel owner and one or more followers) and viewing devices. In one aspect, data center 220 may monitor the number of followers associated with a particular channel plan to identify if multicast delivery methods (e.g., using mobile broadcasting multimedia service (MBMS)) may be useful for content delivery of non-broadcast content. In another aspect, data center 220 may compare multiple channel plans to identify instances where the same unicast content is scheduled for simultaneous distribution on different personalized channels. If instances of simultaneous unicast distribution are identified, data center 220 may elect to apply multicast content delivery methods.

Profile server 230 may include one or more network devices, or other types of computation or communication devices, to store user profile information for users (e.g., users of user devices 270). Profile server 230 may store per-user and/or per-device preferences. The user profile information may include various information regarding a user, such as login information (e.g., a user identifier and a password), billing information, address information, types of services to which the user has subscribed, parental control settings, preferred display format, subtitle defaults, relevant advertising settings, most-watched media, a list of multimedia content purchased by the user, user device identifiers (e.g., a media player identifier, a mobile device identifier, a set top box identifier, a personal computer identifier, etc.) for user devices 270 associated with a user, user content preferences, user tendencies, or the like. In one implementation, profile server 230 may include and/or access a database that includes user/device information from other systems, such as a wireless data service plan, a television subscription plan, or an Internet service plan. Thus, metadata from a single user on multiple devices (e.g., mobile devices, television-based devices, computing devices, etc.) may contribute to user profiles maintained by profile server 230. Application server 224 may use the user profile information from profile server 230 to authenticate a user and may update the user profile information based on the user's activity (e.g., with a user's express permission).

Advertising server 240 may include one or more network devices, or other types of computation or communication devices, that store advertising content that may be delivered to user devices 270. The advertising content may include, for example, metadata that allows the advertising content to be associated with particular groups, categories, and/or profiles. The advertising content may include, for example, a unique identifier for each particular advertisement. In one implementation, advertising server 240 may provide advertising content for insertion into a content stream from VCMS 210.

Suggestion engine 250 may include one or more network devices, or other types of computation or communication devices, that provide suggestions and/or recommendations of specific content (e.g., TV programming, VOD titles, video games, etc.) based on user profiles (from profile server 230), user preferences (e.g., as indicated in a personal channel manager application), or other factors, such as popularity ratings for a show. In one implementation, suggestion engine 250 may provide a suggestion for a scheduled time slot in a personal channel. Suggestion engine 250 may also take into account subscription restrictions, pre-defined parameters set by parents, time-slot length, etc. In some implementations, suggestion engine 250 may track user activity from a television subscription plan, a wireless data plan, and/or an Internet service plan to learn user viewing habits and provide content recommendations.

Customer support system 260 may include one or more network devices, or other types of computation or communication devices, to solicit and/or receive user feedback, questions, or credit-related requests. In one implementation, customer support system 260 may include interfaces with data center 220 and/or a billing system, for example, to receive problem reports and to resolve customer billing disputes.

User devices 270 may generally include navigation devices 110, viewing devices 120, and other computing devices. Navigation device 110 may include a computation or communication device to enable a user to schedule presentation of content and/or interact with viewing device 120 to cause presentation of content. Navigation device 110 may include, for example, a personal communications system (PCS) terminal, a tablet computer, a smartphone, a personal computer, a laptop computer, a wearable computer, or other types of computation or communication devices. In one implementation, navigation device 110 may include a personal channel manager application that enables navigation device 110 to communicate with, for example, data center 220 and/or present information received from data center 220 to a user. The personal channel manager application may permit a user of navigation device 110 to log into an account (e.g., via application server 224), access catalog information (e.g., from catalog server 222), obtain content links to scheduled content, and/or provide presentation instructions to viewing device 120.

Viewing device 120 may include a device that can present content identified by navigation device 110. Viewing device 120 may include, for example, an STB (e.g., connected to a television), a gaming console, an Internet television, a smart television (e.g., a network-connected television), a computing device with a cable card, etc. Viewing device 120 may execute a host application to communicate, via a local wired or wireless connection, with navigation device 110. In one implementation, viewing device 120 may execute an application to communicate via access network 290 with, for example, VCMS 210 or web server 294 to present content based on instructions from navigation device 110. In another implementation, viewing device 120 may be equipped with a dongle to permit secure communications with a personal channel manager application on navigation device 110. In some instances, navigation device 110 and viewing device 120 may be combined in a single device. In one implementation, viewing device 120 may be a closed device (e.g., including a hardware/software configuration that is not accessible to the general public), such as an STB with a unique identifier (e.g., a serial number) that can be used to associate a particular STB with a particular customer/location.

Private network 280 may include, for example, one or more private IP networks that use a private IP address space. Private network 280 may include a local area network (LAN), an intranet, a private wide area network (WAN), etc. In one implementation, private network 280 may implement one or more Virtual Private Networks (VPNs) for providing communication between, for example, any of VCMS 210, data center 220, profile server 230, advertising server 240, suggestion engine 250, and/or customer support system 260. In one implementation, private network 280 may be protected/separated from other networks, such as access network 290, by a firewall. Although shown as a single element in FIG. 2, private network 280 may include a number of separate networks.

Access network 290 may include a local area network (LAN), a wide area network (WAN), such as a cellular network, a satellite network, a fiber optic network, a private WAN, or a combination of the Internet and a private WAN, etc., that is used to transport data. In one implementation, access network 290 may include a managed network that can be used to provide guaranteed service rates and QoS to user devices 270. Although shown as a single element in FIG. 2, access network 290 may include a number of separate networks that provide services to user devices 270.

Content sources 292 may include any type or form of content provider to provide content to VCMS 210 for distribution. For example, content sources 292 may include free television broadcast providers (e.g., broadcast providers, such as NBC, CBS, ABC, and/or FOX) and for-pay television broadcast providers (e.g., TNT, ESPN, HBO, Cinemax, CNN, etc.) that permit content to be streamed and/or downloaded. Content sources 292 may also include on-demand content providers (e.g., video on demand (VOD) providers, pay per view (PPV) providers, etc.), online content providers (e.g., webcasts, podcasts, etc.), etc. In one implementation, content sources 292 may include on-line recording services, such as cloud-based DVR-type services or PVR-type services.

Web server 294 may include one or more network devices, or other types of computation or communication devices, to provide information to user devices 270 and/or to receive information from user devices 270. In one implementation, web server 294 may be part of a social media platform to received and distribute files, such as a personalized channel plan 112, uploaded by a user of user device 270. In another implementation, web server 294 may include an Internet content source, search engine, etc.

Figure 3:
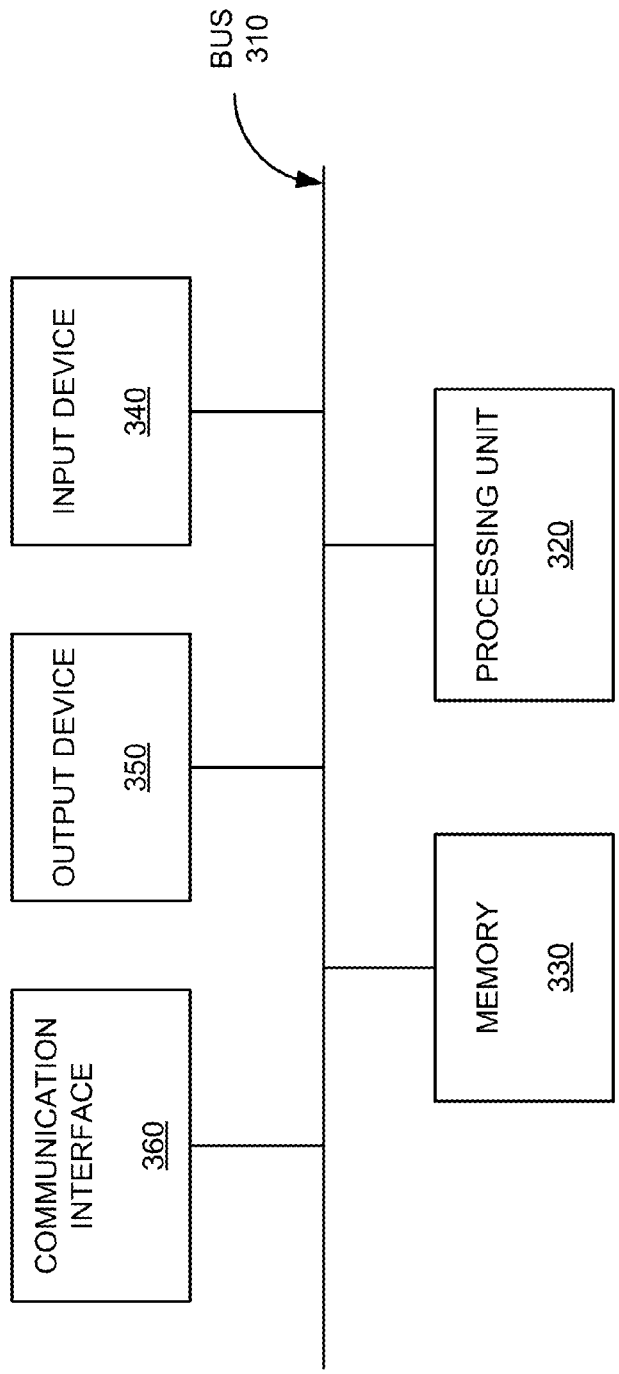
FIG. 3 is a block diagram of exemplary components of a device that may correspond to one of the devices of FIG. 2.

FIG. 3 is a diagram of exemplary components of a device 300. Each of VCMS 210, content delivery system 212, DRM server 214, index file server 216, data center 220, catalog server 222, application server 224, profile server 230, advertising server 240, suggestion engine 250, customer support system 260, user device 270, and web server 294 may be implemented/installed as software, hardware, or a combination of hardware and software, on one or more of device 300. In one implementation, device 300 may be configured as a network device. In another implementation, device 300 may be configured as a computing device. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include wired or wireless (e.g., radio frequency) mechanisms for communicating with other devices, such as other devices of network 200.

As described herein, device 300 may perform certain operations in response to processing unit 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, a display may not be included in device 300. In these situations, device 300 may be a "headless" device that does not include an input device. Alternatively, or additionally, one or more components of device 300 may perform one or more other tasks described as being performed by one or more other components of device 300.

Figure 4:
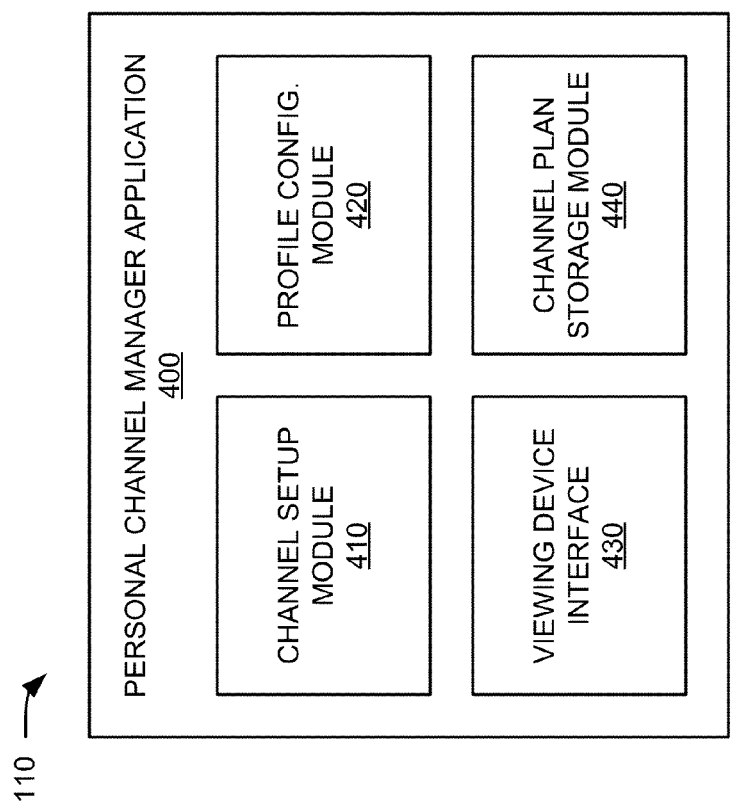
FIG. 4 is a block diagram of exemplary functional components of the navigation device of FIG. 1.

FIG. 4 is a block diagram of exemplary functional components of navigation device 110. The functions described in connections with FIG. 4 may be performed by one or more components of device 300 (FIG. 3), such as processing unit 320 executing instructions stored in memory 330. As shown in FIG. 4, navigation device 110 may include a personal channel manager application 400 that includes a channel setup module 410, a profile configuration module 420, a viewing device interface 430, and a channel plan storage module 440. Generally, personal channel manager application 400 may allow a navigation device 110 solicit a personalized content schedule from a user and to direct presentation of the personalized content schedule on viewing device 120.

Channel setup module 410 may provide a user interface to present content options and configure a personalized content schedule (or channel plan). Content options may include, for example, items from catalog server 222, items from web server 294, and/or other multimedia content accessible via access network 290. In one implementation, channel setup module 410 may provide a grid of time slots that can be selectively filled in with content items from a catalog listing. For example, channel setup module 410 may include a drag-and-drop interface to insert content selections into a particular time slot in the grid. In one implementation, selected linear content (e.g., television content, VOD content, downloads, streaming media, etc.) may automatically fill an amount of time in the grid that corresponds to a selected program. In another implementation, selected non-linear content (e.g., games, music, social media, etc.) may be assigned a duration by the user. In still another implementation, a user may assign a default channel or content source for any time period not otherwise scheduled in the personalized content schedule. Channel setup module 410 may also be used to modify existing channel plans. Channel setup module 410 may communicate with content distribution network 130 to obtain particular links (e.g., URLs) for content items in the personalized content schedule. In some implementations, channel setup module 410 may also provide new/updated channel plans to content distribution network.

Profile configuration module 420 may provide a user interface to solicit user preferences. For example, profile configuration module 420 may allow a user to provide definitive settings to guide/limit suggested content. Settings provided by a user may include, for example, user data (e.g., age, gender, etc.) and/or content preferences, such as content ratings (Motion Picture Association of America (MPAA) ratings, etc.), content age, favorite actors, preferred genres, minimum critic/viewer ratings, etc. In one implementation, profile configuration module 420 may communicate with profile server 230, advertising server 240, and/or suggestion engine 250 to allow content distribution network 130 to identify suggested content and/or advertising for a user's personalized channel.

Viewing device interface 430 may communicate with viewing device 120 to present a personalized content schedule from channel setup module 410. In one implementation, viewing device interface 430 may communicate with a host application executed on viewing device 120 to instruct viewing device 120 when and what channel/content to display. For example, viewing device interface 430 may monitor the personalized content schedule and, depending on the type of content included in the current time slot of personalized channel plan 112, viewing device interface 430 may instruct viewing device 120 to tune to a particular broadcast channel, load VOD content, or access a URL for web-based content.

Viewing device interface 430 may monitor a personalized content schedule, retrieve one or more links to upcoming content, and provide the links to viewing device 120 for presentation according to the personalized content schedule. Viewing device interface 430 may identify viewing devices 120 that are available to present a personalized content schedule based on instructions from navigation device 110. In one implementation, viewing device interface 430 may identify viewing device 120 via wireless network discovery protocols, such as WiFi protocols, Bluetooth protocols, or other wireless protocols. In another implementation, viewing device interface 430 may apply additional application programming interfaces (APIs), protocols, and/or procedures to identify a type of viewing device 120.

Channel plan storage module 440 may retrieve and/or store personalized channel plans. For example, channel plan storage 440 may store multiple personalized channel plans for a single user or for different users of navigation device 110. In one implementation, channel plan storage module 440 may also upload a personalized channel plan to content distribution network 130.

Although FIG. 4 shows exemplary functional components of navigation device 110, in other implementations, navigation device 110 may include fewer components, different components, or additional components than depicted in FIG. 4. Alternatively, or additionally, one or more functional components of navigation device 110 may perform one or more other tasks described as being performed by one or more other functional components of navigation device 110. Furthermore, one or more functional components of FIG. 4 may be performed on a different user device 270. For example, in some implementations, channel setup module 410 may be accessed with user device 270 via a website account and the resulting personalized channel plan later retrieved/stored on navigation device 110.

Figure 5:
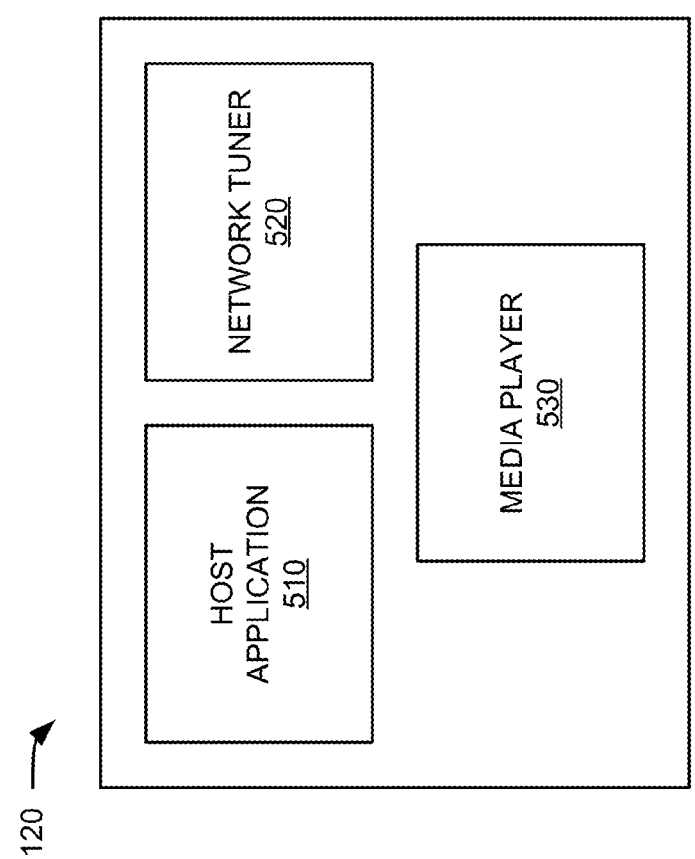
FIG. 5 is a block diagram of exemplary functional components of the viewing device of FIG. 2.

FIG. 5 is a diagram of exemplary functional components of viewing device 120. In one implementation, the functions described in connection with FIG. 5 may be performed by one or more components of device 300 (FIG. 3), such as processing unit 320 executing instructions stored in memory 330. As shown in FIG. 5, viewing device 120 may include a host application 510, a network tuner 520, and a media player 530.

Generally, viewing device 120 may receive a television signal from content distribution network 130, may convert the signal to a form usable for a television display, and may transmit the signal to the television display for presentation to a user. Viewing device 120 may further allow a user to provide user input for interactive television applications (e.g., to navigate menu displays and/or select menu items) and to alter the programming provided to viewing device 120 based on a signal received from, for example, a navigation device 110.

Host application 510 may interface with navigation device 110 (e.g., via one or more APIs) to receive instructions for presenting a personalized channel plan on viewing device 120. Host application 510 may also retrieve information/content from devices in content distribution network 130 to present to a user. In another implementation, host application 510 may receive content (e.g., streaming media, non-linear content, etc.) from navigation device 110 for presentation. Additionally, or alternatively, host application 510 may obtain a link to redirect viewing device 120 to a particular index file (e.g., associated with content for channel plan 112) based on a device location.

Network tuner 520 may select and tune to specific broadcast television information by tuning to one of various different input channels from VCMS 210. Each channel may be digitally modulated using, for example, Quadrature Amplitude Modulation (QAM), though other types of modulation may be used. A demodulator may demodulate the information in the channel selected by tuner 400 to produce a transport stream (e.g., MPEG-2 or MPEG-4 transport stream) containing the audio, video and/or other information related to a selected program for presentation on output components (e.g., a television display, speakers, etc.) of viewing device 120.

Media player 530 may receive content segments from a network stream and/or local buffer and may present the content segments as a unified presentation. In one implementation, media player 530 may decode and play content that is streamed and/or buffered from VCMS 210. In another implementation, media player 530 may decode and play content from other sources, such as a web site. Media player 530 may output the decoded video to output components of viewing device 120.

Although FIG. 5 shows exemplary functional components of viewing device 120, in other implementations, viewing device 120 may include fewer components, different components, or additional components than depicted in FIG. 5. Alternatively, or additionally, one or more functional components of viewing device 120 may perform be performed by one or more other devices of network 200.

Figure 6:
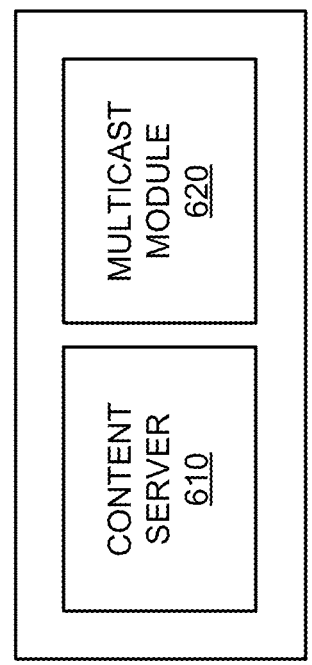
FIG. 6 is a block diagram of exemplary functional components of the content delivery server of FIG. 2.

FIG. 6 is a diagram of exemplary functional components of content delivery system 212. In one implementation, the functions described in connection with FIG. 6 may be performed by one or more components of device 300 (FIG. 3), such as processing unit 320 executing instructions store in memory 330. As shown in FIG. 6, content delivery system 212 may include a content server 610 and a multicast module 620.

Content server 610 may temporarily store and provide content requested by navigation device 110 and/or viewing device 120. In one implementation, access to content server 610 (e.g., by navigation device 110 and/or viewing device 120) may be restricted by a service provider that operates VCMS 210. For example, access to content server 610 may be restricted to users with particular subscription packages and enforced by, for example, password protection, device identifiers (for user devices 270), and/or application identifiers (e.g., personal channel manager application 400, host application 510, etc.). Content server 610 may include other devices (not shown), such as a policy management server, a streaming device, a router, a content cache, etc. Content server 610 may provide a separate channel/link of the same content for different content formats. For example, content server 610 may generate a content stream that is compatible with a platform (e.g., a particular combination of hardware software) of some user devices 270, while another content stream may be used for other types of user devices 270.

Multicast module 620 may identify if demand for content from a shared personal channel should be included in a multicast stream. For example, when a large number of user devices 270 are following a particular personalized channel plan 112 (such as a celebrity's personalized channel with a large number of social media followers) content distribution network 130 may benefit from multicast delivery for particular on-demand content scheduled in the personalized channel plan 112. Multicast module 620 may configure multicast sessions for distribution of the digital content. For example, multicast module 620 may communicate with a multicast streaming device to stream requested video content associated with a personal channel. Multicast module 620 may use internet protocol (IP) multicast addresses for IP flows that can be received simultaneously by viewing devices 120 (e.g., viewing devices that are subscribed to and have joined a particular multicast group associated with a content selection for the personalized channel).

In another implementation, multicast module 620 may utilize multicast streaming in a manner that optimizes use of network and/or media streaming resources for delivery of on-demand content. For example, multicast module 620 may provide different unicast segments (e.g., to start an on-demand program) and multicast segments (e.g., of an in-progress multicast delivery) to a viewing device 120. Multicast module 620 may work with viewing devices 120 to provide this hybrid of unicast and multicast content simultaneously so that viewing devices 120 may buffer multicast portions as needed to assemble and provide a linear presentation.

Although FIG. 6 shows exemplary functional components of viewing device 120, in other implementations, viewing device 120 may include fewer components, different components, or additional components than depicted in FIG. 6. Alternatively, or additionally, one or more functional components of viewing device 120 may perform be performed by one or more other devices of network 200.

Figure 7:
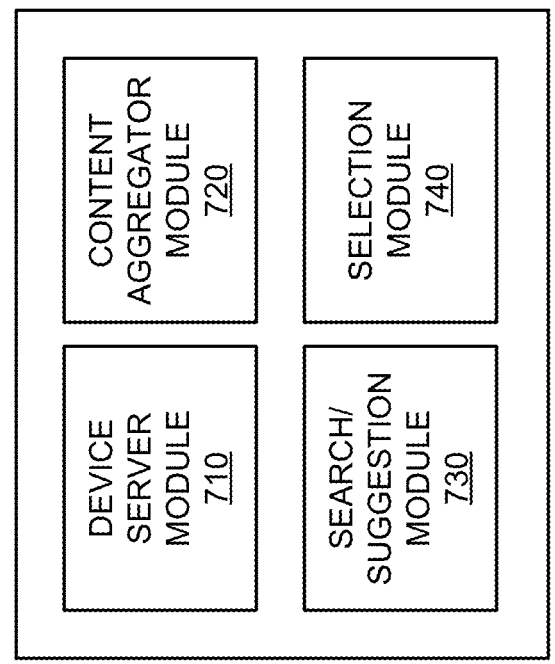
FIG. 7 is a block diagram of exemplary functional components of the application server of FIG. 2.

FIG. 7 is a diagram of exemplary functional components of application server 224. In one implementation, the functions described in connection with FIG. 7 may be performed by one or more components of device 300 (FIG. 3), such as processing unit 320 executing instructions store in memory 330. As shown in FIG. 7, application server 224 may include a device server module 710, a content aggregator module 720, a search/suggestion module 730, and a selection module 740.

Device server module 710 supports interactions between user devices 270 (e.g., navigation device 110 and/or viewing device 120) and backend servers, including (but not limited to) content delivery system 212, DRM server 214, index file server 216, and catalog server 222. Device server module 710 may determine which content format to use according a device type or platform of viewing device 120. For example, in one implementation, navigation device 110 may request, from application server 224, a streaming link or channel identifier for an item in a personalized content schedule just prior to a scheduled time slot. The request may include a content identifier and an identifier for viewing device 120. Device server module 710 may identify an appropriate format (e.g., bit rate, resolution, standard, file size, etc.) for the requested content on viewing device 120.

Based on the selected content and format, device server module 710 may provide/generate a streaming link. Navigation device 110 may receive the streaming link and provide the streaming link to viewing device 120 to present the scheduled content. In another implementation, viewing device 120 may request the streaming link for the item in the personalized content schedule based on instructions from navigation device 110, and device server module 710 may provide the content link directly to viewing device 120. In one implementation, device server module 710 may identify a location of viewing device 120 (e.g., based on account information and a device identifier) and provide/generate a streaming link based on the location (along with the content selection and device type). For example, a location may be used to select a link with particular advertising, regional content, and/or blackouts.

Content aggregator module 720 aggregates information from Internet searching and social networks related to particular content (e.g., a program or video) for a user to include in a personalized channel. In one implementation, content aggregator module 720 may provide links or other menu options to enable a user to schedule content provided by content aggregator module 720.

Search/suggestion module 730 enables users to search catalog server 222 and other devices/systems by keywords. Search/suggestion module 730 may also provide ranked search results based on the user's search terms, profile, viewing history, or previously-purchased content. In one implementation, search/suggestion module 730 can also automatically recommend particular content to the user based on input from suggestion engine 250.

Selection module 740 enables users to review and select content from a variety of sources, including items from catalog server 222 and content aggregator module 720. Selection module 740 may support browsing and searching of a customized content list (e.g., a unified catalog from catalog server 222 and content aggregator module 720) from navigation device 110/personal channel manager application 400. In one implementation, selection module 740 may include a customized content listing based on a user's subscription package with a service provider (e.g., a basic, extended, or premium service option). In another implementation, selection module 740 may include, in a customized content listing, other personalized channels from a user's social media contacts. In some implementations, selection module 740 may also provide an electronic shopping cart, transaction management, and/or promotions and advertisements.

Although FIG. 7 shows exemplary functional components of application server 224, in other implementations, application server 224 may include fewer components, different components, or additional components than depicted in FIG. 7. Alternatively, or additionally, one or more functional components of application server 224 may be performed by one or more other devices of content distribution network 130.

Figure 8:
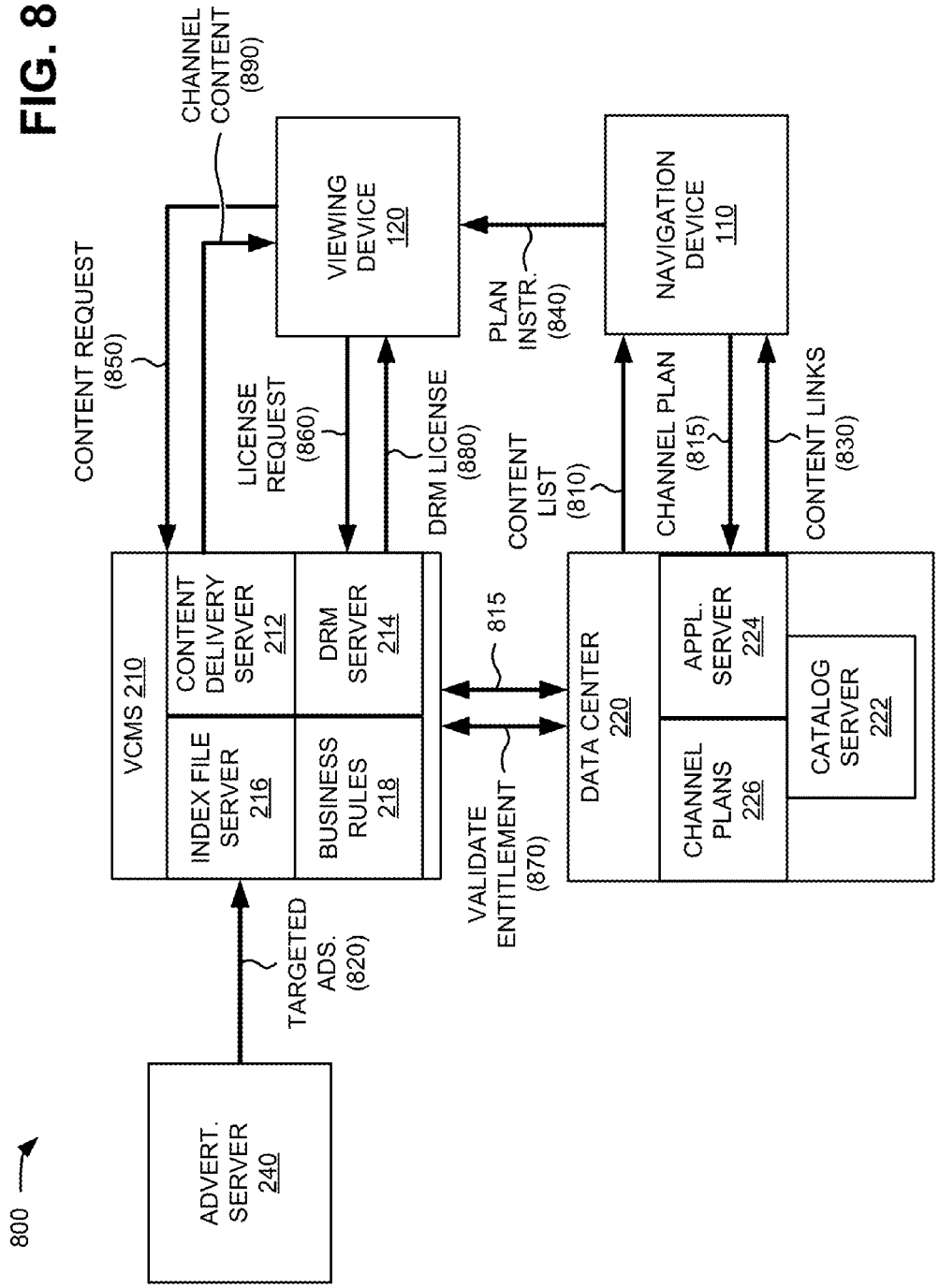
FIG. 8 is a block diagram of exemplary communications among devices in a portion of the network of FIG. 2.

FIG. 8 is a diagram of exemplary communications for a portion 800 of network 200. Communications in FIG. 8 may represent communications to configure and present content for a personalized channel according to implementations described herein. As shown in FIG. 8, network portion 800 may include navigation device 110, viewing device 120, VCMS 210, data center 220, and advertising server 240. Navigation device 110, viewing device 120, VCMS 210, data center 220, and advertising server 240 may include features described above in connection with, for example, FIGS. 1-7.

As shown in FIG. 8, data center 220 (e.g., application server 224) may provide a content list 810 to navigation device 110. Content list 810 may include, for example, items from catalog server 222 and/or content aggregator module 720. Navigation device 110 may receive content list 810, and the user of navigation device 110 may use personal channel manager application 400 (e.g., executing on navigation device 110) to configure a personalized channel using content items from content list 810. Based on the configured personalized channel, navigation device 110 may provide a channel plan 815 to data center 220. Channel plan 815 may include all or a portion of items from the personalized channel, a presentation schedule, a selected viewing device (e.g., viewing device 120), and/or a user identifier.

Data center 220 may receive channel plan 815 and may forward channel plan 815 to VCMS 210. VCMS 210 (e.g., index file server 216) may use channel plan 815 and other data (e.g., from profile server 230, suggestion engine 250, etc.) to identify targeted advertising for the personalized channel. In one implementation, VCMS 210 may base selections for targeted advertising, in part, on the overall content schedule for the personalized channel (e.g., the type of content presented before, during, or after the advertising segment). Additionally, or alternatively, VCMS 210 may base selections for targeted advertising based on user profile information (e.g., from profile server 230) and/or business rules 218. VCMS 210 may retrieve selected targeted advertisements 820 from advertising server 240.

In one implementation, VCMS 210 may also use channel plan 815 to identify a delivery method for particular content within channel plan 815. For example, data center 220 may receive multiple requests for the same channel plan or multiple channel plans with the same content schedule (e.g., for a particular event). In one particular example, on-demand or local content may be associated with a personalized channel that has a large number of followers (e.g., a celebrity's personalized channel) and, thus, creates a high simultaneous viewing demand for non-broadcast content. If the number of simultaneous viewers is large enough, VCMS 210 may decide to provide content as a multicast stream instead of, for example, a default unicast stream, based on the channel plan and the expected number of viewers.

Data center 220 may also generate/assign content links 830 for the items in the personalized channel. The content links 830 may include a channel, IP address, URL, or another link to allow navigation device 110 or viewing device 120 to obtain and present content for items in the personalized channel. In one implementation, content links 830 may include a URL for a private managed network (e.g., a private portion of access network 290). Thus, if accessible to viewing device 120, a service provider may provide requested content with guaranteed QoS levels and/or other benefits that may not be available through a public network or with non-Guaranteed Bit Rate (GBR) traffic. For example, one or more of content links 830 may direct a device (e.g., viewing device 120) to a network location that is only accessible to particular devices (e.g., a proprietary STB) or particular accounts (e.g., subscribers with verified account credentials). In other implementations, one or more of content links 830 may provide unrestricted access to content.

Content links 830 may be provided to navigation device 110. In one implementation, data center 220 may provide content links 830 in a distributed manner. That is, at least some of content links 830 may not be defined/available within content delivery network 130 when channel plan 815 is initially sent to data center 220. Thus, navigation device 110 and data center 220 may perform multiple iterations of exchanging channel plan 815 and content links 830 over time. For example, navigation device 110 may provide channel plan 815 (and data center 220 may respond with a new content link 830) each time the personalized channel is scheduled to present a new content item.

Navigation device 110 may provide content links 830 as plan instructions 840 to viewing device 120. Plan instructions 840 may include, for example, links to scheduled content and/or tuning instructions. Plan instructions 840 may be provided to viewing device 120 individually, in aggregation, or both individually and aggregated. For example, at the start of each new content item in the particular sequence of content for the personalized channel, navigation device 110 may provide, to viewing device 120, the next one of plan instructions 840 needed for the personalized channel. Alternatively, if viewing device 120 has the capability and when multiple links in a sequence are available, navigation device 110 may provide multiple plan instructions 840 (e.g., for several consecutive items) for the personalized channel. In some implementations, navigation device 110 may provide the multiple links to viewing device 120 when viewing device 120 is within close proximity (e.g., RF range for a local wireless connection) of viewing device 120, for use by viewing device 120 when navigation device 110 is not is close proximity.

In some instances, content associated with plan instructions 840 may be subject to copyright and/or license restrictions. Upon receiving plan instructions 840, viewing device 120 may access a streaming URL (e.g., in one of plan instructions 840) to request particular content from VCMS 210, as indicated by reference number 850. In response, VCMS 210 (e.g., content delivery system 212) may begin streaming the requested channel content 890, including a content header. Requested channel content 890 may include, for example, a broadcast stream, a multicast stream, or a unicast stream, as determined (at least in part) by the type of content and the viewing audience size. A content header can include information about where to fetch a DRM license to permit viewing device 120 to display the channel content 890. Based on the content header, viewing device 120 may submit a license request 860 to VCMS 120 (e.g., DRM server 214) to retrieve the DRM license.

VCMS 210 (e.g., DRM server 214) may receive license request 860 and may communicate with data center 220 to validate the user's entitlement for the requested content, as indicated by reference number 870. If the validation is successful, VCMS 120 (e.g., DRM server 214) may return the DRM license 880 to viewing device 120. A DRM agent on viewing device 120 may validate DRM license 880 for viewing device 120, and viewing device 120 may play the channel content 890 if viewing device 120 is validated.

Although FIG. 8 shows exemplary communications within network portion 800, in other implementations, different communications may be used than depicted in FIG. 8. For example, in another implementation, plan instructions 840 may include a channel identifier that can be tuned to by viewing device 120 (e.g., when viewing device 120 includes a STB/TV combination). In still another implementation, plan instructions 840 may include an IP address for a web site that can be accessed via viewing device 120. In still another implementation, content associated with one or more of plan instructions 840 may be retrieved by navigation device 110 and the actual content may be sent through navigation device 110 for presentation on viewing device 120.

Figure 9:
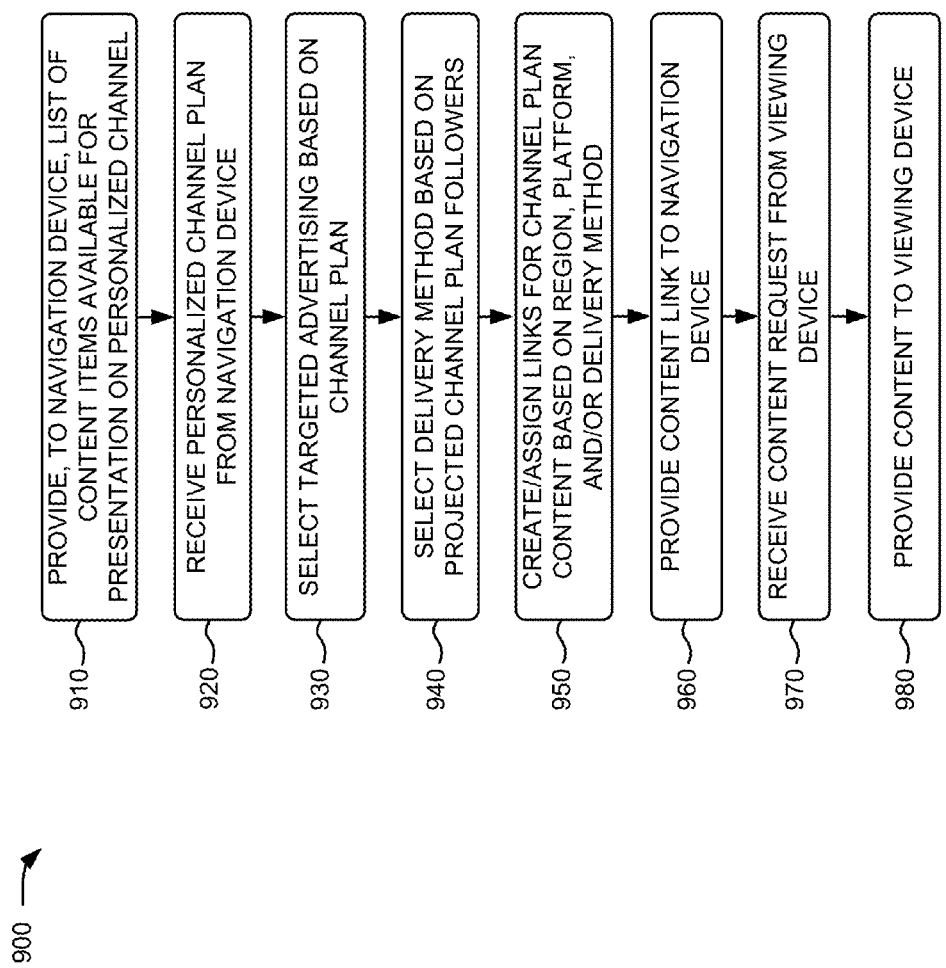
FIG. 9 is a flow diagram of an exemplary process for configuring and providing content for a personalized channel according to an implementation described herein.

FIG. 9 is a flow diagram of an exemplary process 900 for configuring and providing content for a personalized channel. In one implementation, process 900 may be performed by one or more devices in content distribution network 130. In other implementations, process 900 may be performed by navigation device 110 and/or viewing device 120 in conjunction with one or more devices from content distribution network 130.

Process 900 may include providing, to a navigation device, a list of content items available for presentation on a personalized channel (block 910) and receiving a personalized channel plan from the navigation device (block 920). For example, data center 220 (e.g., application server 224) may provide a content list 810 to navigation device 110. Content list 810 may include, for example, items from catalog server 222 and/or content aggregator module 720. Navigation device 110 may receive content list 810, and the user of navigation device 110 may use personal channel manager application 400 (e.g., executing on navigation device 110) to configure a personalized channel using content items from content server 610. In another implementation, a user may access the content index via a web page from user device 270 that includes a user interface to configure the personalized channel plan. Navigation device 110 may provide the user's channel plan (e.g., channel plan 815) to data center 220 via a wired and/or wireless network. The channel plan may include a content schedule along with a viewing device identifier that may indicate a region and/or platform for the viewing device (e.g., viewing device 120).

Process 900 may also include selecting targeted advertising based on the channel plan (block 930). For example, as described in connection with FIG. 8, VCMS 210 may use channel plan 815 and other information (e.g., a viewer's demographic profile, what the user is watching, a location of the user, the user's buying history, etc.) to identify targeted advertising for the personalized channel. VCMS 210 may, for example, base selections for targeted advertising on the attributes of content presented before, during, and/or scheduled after a particular advertising segment.

Process 900 may also include selecting a delivery mechanism based on the projected channel plan followers (block 940). For example, as described in connection with FIG. 8, VCMS 210 may use channel plan 815 to identify a delivery method for particular content within channel plan 815. VCMS 210 may identify a statistically significant number of viewers (e.g., 10, 200, 5,000, etc.) following the same channel plan, and may determine that multicast delivery may be appropriate for particular content (e.g., instead of a default unicast delivery).

Process 900 may further include creating and/or assigning a link for the channel plan content based on a region, platform, and/or delivery method (block 950). For example, based on the schedule for the user's personalized channel, data center 220 may identify a channel, IP address, URL, or another link to allow viewing device 120 to obtain and present content for items in the personalized channel. In one implementation, the link (e.g., link 830) may provide content optimized for a particular platform (e.g., device/software combination) associated with viewing device 120. In another implementation, the link may be specific to a particular geographical or subscriber region. In still another implementation, different links may be used to differentiate multicast or unicast content delivery.

Process 900 may additionally include providing a content link to the navigation device (block 960), receiving a content request from a viewing device (block 970), and providing the requested content to the viewing device (block 980). For example, as described in connection with FIG. 8, data center 220 may provide content links (e.g., content links 830) for each of the content items in a particular channel plan. Navigation device 110 may send the links (e.g., either serially or in bulk) to viewing device 120 as plan instructions (e.g., plan instructions 840). Viewing device 120 may use the links to generate a content request (e.g., content request 850) for particular content in the linear channel sequence. VCMS 210 may receive the content request and provide content from the identified link. In one implementation, the content may include targeted advertising based on the particular aggregation of content in the corresponding channel plan. In addition, in some implementations, VCMS 210 may provide a DRM license 880 to viewing device 120 to allow content viewing.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
    providing, by a network device and to a user device, a personal channel manager application to solicit a personalized content schedule from a user and to direct presentation of the personalized content schedule on a viewing device that is different than the user device, wherein the personal channel manager application uses an application programming interface (API) to enable communications between the user device and the viewing device;
    providing, by the network device and to the user device, a content list of content items available for presentation;
    receiving, by the network device and from the user device, a personalized channel plan that includes a schedule of selected content items, from the content list, for presentation on the viewing device and a viewing device identifier for the viewing device;
    selecting, by the network device and based on the selected content items, advertising for inclusion with the selected content items;
    monitoring, by the network device, a number of social media followers for the personalized channel plan and other personalized channel plans that include one of the selected content items;
    identifying, by the network device and based on the monitoring of the number of social media followers, a projected number of simultaneous presentations scheduled for the one of the selected content items;
    selecting, by the network device and based on the identifying, a delivery method to support the projected number of simultaneous presentations for the one of the selected content items, wherein the delivery method is selected from a group including broadcast, multicast, and unicast delivery based on a statistical significance of the projected number;
    assigning, by the network device and after receiving the personalized channel plan, a link to the one of the selected content items with the selected delivery method,
        wherein the link enables the personal channel manager application on the user device to direct, via the API, presentation of the one of the selected content items on the viewing device, and
        wherein the link includes a uniform resource locator (URL), based on the viewing device identifier, identifying a network location to retrieve a content stream formatted with a data format and resolution compatible with a particular type of the viewing device;
    sending, by the network device, the link to the user device;
    receiving, by the network device and from the viewing device via the link, a content request for the one of the selected content items; and
    providing, by the network device and to the viewing device, the one of the selected content items via one of a closed cable or fiber optic distribution network.

2. The method of claim 1, wherein selecting the delivery method to support the projected number of simultaneous presentations includes selecting a multicast stream over a default unicast stream for the one of the selected content items based on the number of social media followers of the personalized channel plan and other personalized channel plans that include the one of the selected content items.

3. The method of claim 1, wherein the link enables the viewing device to access the one of the selected content items with a guaranteed quality of service (QoS) level, and wherein sending the link to the user device includes sending the link via a public access network that is different than the controlled access network.

4. The method of claim 1, wherein the selected content items include content from different physical or virtual television channels.

5. The method of claim 4, wherein the selected content items include web-based content.

6. The method of claim 1, further comprising:
    assigning, by the network device and after receiving the personalized channel plan, another link to another one of the selected content items with the selected delivery method,
        wherein the other link enables the personal channel manager application on the user device to direct, via the API, presentation of the other one of the selected content items on the viewing device, and
        wherein the link includes another URL, based on the viewing device identifier, identifying a network location to retrieve another content stream formatted with the data format and resolution compatible with the particular type of the viewing device; and
    sending, by the network device, the other link to the user device.

7. The method of claim 1, wherein the selected content items include personal video recordings stored in a remote network.

8. The method of claim 1, wherein the selected content items include an automatically-suggested content item, for presentation at a particular time, based on user instructions.

9. The method of claim 1, wherein selecting the advertising for inclusion with the selected content items further comprises:
selecting the advertising based on an aggregation of the selected content items in the personalized channel plan.

10. The method of claim 9, wherein the aggregation includes selected content items from the personalized channel plan that are scheduled for future presentation.

11. The method of claim 1, wherein the user device includes a mobile computing device and wherein the viewing device includes a set-top box (STB), a cable card, or a smart television.

12. One or more network devices, comprising:
a first network interface to communicate with a user device;
a second network interface to communicate with a viewing device that is different than the user device;
a memory for storing instructions; and
one or more processors to execute the instructions to:
provide, to the user device, a personal channel manager application to solicit a personalized content schedule from a user and to direct presentation of the personalized content schedule on the viewing device, wherein the personal channel manager application uses an application programming interface (API) to enable communications between the user device and the viewing device,
provide, to the user device via the first network interface, a content list of content items available for presentation,
receive, from the user device, a personalized channel plan that includes a schedule of selected content items, from the content list, for presentation on the viewing device and a viewing device identifier for the viewing device,
select, based on the selected content items, advertising for inclusion with selected content items,
monitor a number of social media followers for the personalized channel plan and other personalized channel plans that include one of the selected content items,
identify, based on the monitoring of the number of social media followers, a projected number of simultaneous presentations scheduled for the one of the selected content items,
select, based on the identifying, a delivery method to support the projected number of simultaneous presentations for the one of the selected content items, wherein the delivery method is selected from a group including broadcast, multicast, and unicast delivery based on a statistical significance of the projected number,
assign, after receiving the personalized channel plan, a link to the one of the selected content items that enables the personal channel manager application on the user device to direct, via the API, presentation of the one of the selected content items on the viewing device, wherein the link includes a uniform resource locator (URL), based on the viewing device identifier, identifying a network location to retrieve a content stream formatted with a data format and resolution compatible with a particular type of the viewing device,
send the link to the user device,
receive, from the viewing device over the second network interface and via the link, a content request for the one of the selected content items, and
provide, to the viewing device via the second network interface, the one of the selected content items.

13. The one or more network devices of claim 12, wherein the one or more processors are further to:
assign, after receiving the personalized channel plan, another link to another one of the selected content items,
wherein the other link enables the personal channel manager application on the user device to direct, via the API, presentation of the other one of the selected content items on the viewing device, and
wherein the link includes another URL, based on the viewing device identifier, identifying a network location to retrieve another content stream formatted with the data format and resolution compatible with the particular type of the viewing device; and
send the other link to the user device.

14. The one or more network devices of claim 12, wherein the one or more processors are further to:
deliver the one of the selected content items using both unicast and multicast delivery for different portions of the one of the selected content items.

15. The one or more network devices of claim 12, wherein the one or more processors are further to:
identify, based on the personalized channel plan, a region associated with the viewing device, and
apply, based on the identified region, regional broadcast variants to the selected content items.

16. The one or more network devices of claim 12, wherein the selected content items include live linear broadcast content and on-demand content.

17. The one or more network devices of claim 12, wherein the one or more processors are further to execute the instructions to:
store, in the memory, the personalized channel plan.

18. A non-transitory computer-readable medium, storing instructions executable by one or more processors, the non-transitory computer-readable medium comprising one or more instructions to:
provide, to a user device, a personal channel manager application to solicit a personalized content schedule from a user and to direct presentation of the personalized content schedule on a viewing device that is different than the user device, wherein the personal channel manager application uses an application programming interface (API) to enable communications between the user device and the viewing device,
provide, to the user device via a first network interface, a content list of content items available for presentation,
receive, from the user device, a personalized channel plan that includes a schedule of selected content items, from the content list, for presentation on the viewing device and a viewing device identifier for the viewing device,
select, based on the selected content items, advertising for inclusion with the selected content items,
monitor a number of social media followers for the personalized channel plan and other personalized channel plans that include one of the selected content items,
identify, based on the monitoring of the number of social media followers, a projected number of simultaneous presentations scheduled for the one of the selected content items,
select, based on the identifying, a delivery method to support the projected number of simultaneous presentations for the one of the selected content items, wherein the delivery method is selected from a group including broadcast, multicast, and unicast delivery based on a statistical significance of the projected number,
    assign, after receiving the personalized channel plan, a link to the one of the selected content items that enables the personal channel manager application on the user device to direct, via the API, presentation of the one of the selected content items on the viewing device, wherein the link includes a uniform resource locator (URL), based on the viewing device identifier, identifying a network location to retrieve a content stream formatted with a data format and resolution compatible with a particular type of the viewing device,
send the link to the user device,
    receive, from the viewing device over the second network interface and via link, a content request for the one of the selected content items, and
    provide, to the viewing device via the second network interface, the one of the selected content items.

19. The non-transitory computer-readable medium of claim 18, further comprising one or more instructions to:
    assign, after receiving the personalized channel plan, another link to another one of the selected content items,
        wherein the other link enables the personal channel manager application on the user device to direct, via the API, presentation of the other one of the selected content items on the viewing device, and
        wherein the link includes another URL, based on the viewing device identifier, identifying a network location to retrieve another content stream formatted with the data format and resolution compatible with the particular type of the viewing device; and
send the other link to the user device.

20. The non-transitory computer-readable medium of claim 18, wherein the one or more instructions to select the advertising for inclusion with the selected content items further comprises one or more instructions to:
    select the advertising based on an aggregation of user profile data from at least one of a wireless data service plan, a television subscription plan, and an Internet service plan.

\* \* \* \* \*